No. 803,271. PATENTED OCT. 31, 1905.
F. F. COLE.
MOLD FOR PLASTIC MATERIAL.
APPLICATION FILED MAR. 27, 1905.
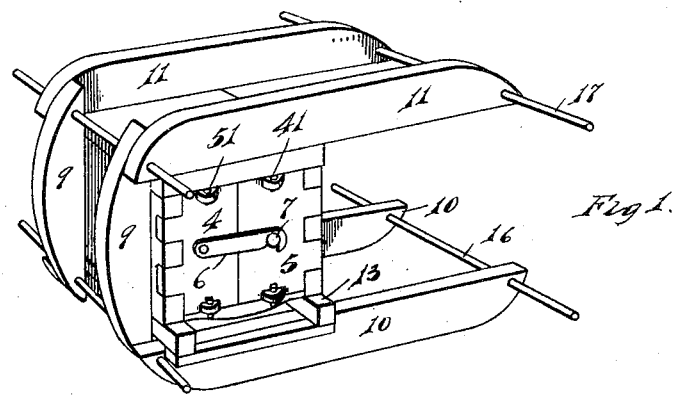
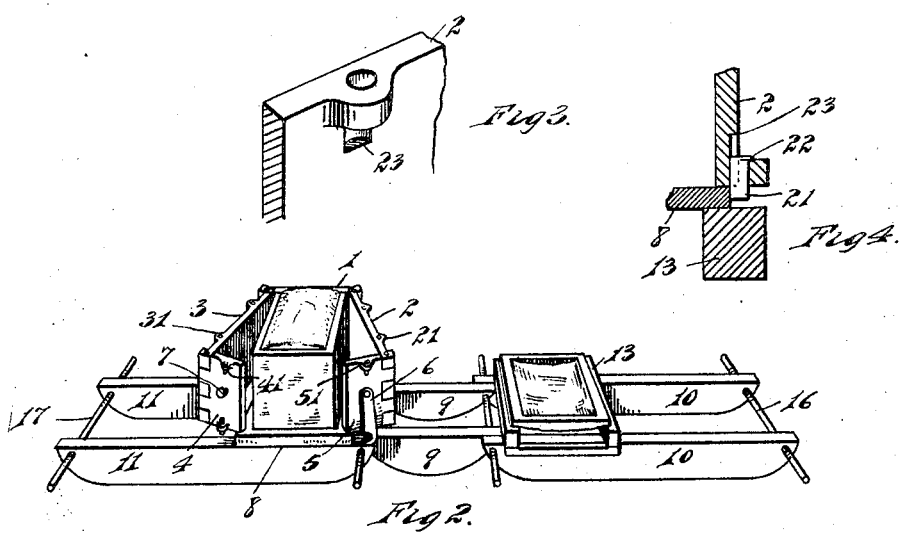
WITNESSES
T. J. Massey
C. F. Day
INVENTOR
Frank F. Cole
By Parker & Burton Attorneys.

UNITED STATES PATENT OFFICE.

FRANK F. COLE, OF ALBION, MICHIGAN.

MOLD FOR PLASTIC MATERIAL.

No. 803,271.　　　　Specification of Letters Patent.　　　　Patented Oct. 31, 1905.

Application filed March 27, 1905. Serial No. 252,243.

*To all whom it may concern:*

Be it known that I, FRANK F. COLE, a citizen of the United States, residing at Albion, county of Calhoun, State of Michigan, have invented a certain new and useful Improvement in Molds for Plastic Material; and I declare the following to be a full, clear, and exact description of the invention, such as will enable others skilled in the art to which it pertains to make and use the same, reference being had to the accompanying drawings, which form a part of this specification.

This invention relates to molds for plastic material.

It has for its object an improved mold employed in the construction of artificial-stone building-blocks.

In the drawings, Figure 1 shows the mold closed and in the frame by which it is handled. Fig. 2 shows the frame open and the mold open and parts separated. Fig. 3 is a detail of the stop. Fig. 4 is a detail sectional view of the stop.

The mold is made with a top and a bottom piece and with side and end pieces. The side and end pieces are hinged together. The top and bottom pieces are removable from the sides and end pieces.

1 indicates an end of the mold, to which are hinged two side pieces 2 and 3, and to the side pieces 2 and 3 are hinged two pieces 4 and 5, which together form the end of the mold opposite the end 1. The pieces 4 and 5 meet at about the middle vertical line of the end of the mold, and one of the pieces is provided with a swinging hook 6, that engages over a catch or knob 7 on the other pieces.

The parts which form the top and bottom inclosures of the mold are somewhat wider and somewhat longer than the space inclosed by the side pieces of the mold, and in the assembled structure the bottom engages under the edge of those pieces which form the side boundaries and the top engages over the edges of the side pieces. Each of the side pieces is provided with a number of sliding pins that drop into sockets on the side pieces and which project from the side piece on the lower side thereof in whichever position the side pieces are placed.

As shown in Fig. 4, the pins on the lower side of the pieces 1, 2, 3, 4, and 5 drop below the lower surface of the bottom board 8, while the pins on the upper side of the same pieces have their upper ends flush with or slightly below the upper edge faces of the same pieces. If the mold be reversed to the position shown in Fig. 1, so that those faces which in Fig. 2 are shown at the top are brought to the bottom of the mold, the upper pins in the holes 21, 31, 41, and 51 now at the bottom of the mold will project below the now lower edge faces, as indicated in Fig. 4.

The object of the pins 21 31, &c., is to engage against the edge of that one of the face-plates which for the time being is the bottom boards of the mold and locate the sides properly with reference to the bottom while the mold is empty and before it has been filled with cement material. At the same time the upper surface is entirely free from obstruction and can be readily "struck" after the mold has been filled with cement material.

A handling device to be used with the mold consists of rocker-pieces 9, to which are pivoted clamp-pieces 10 and 11. The clamp-pieces 10 and 11 are each longer than the cross-breadth of the mold, preferably about twice as long, and the rocker-pieces 9 are so much longer than the vertical depth of the mold that the pieces 10 and 11 may be pivoted to them and while so pivoted to them brought to a position of parallelism the one to the other, with a distance between the pieces 10 and 11 equal to the vertical depth of the mold, the top and the bottom boundary-pieces of the mold, and a support 13 for one of boundary-pieces that will be explained hereinafter. The pieces 10 and 11 are pivoted to the piece 9 by bars which extend through two sides of the rocker-pieces, and these, with the bars of handle-pieces 10 and 11, constitute a frame which may be folded in on the mold or may be opened out, as shown in Fig. 2. That one of the mold-faces in which the ornamented face or simulated rock-facing of the artificial stone is cast is preferably supported upon an auxiliary frame 13, by which it is located properly with reference to its final closing in over the other parts of the mold and to which it may be secured temporarily for convenience of handling.

In using this mold either one of the pieces which constitute either the top or the bottom is secured temporarily in place on the handling-frame and the side closures of the mold placed over the selected bottom or top, with respect to which the side pieces locate themselves and are held in position by the pins 21 31, &c. The mold is then filled with the plastic compound and struck and the final closure-piece, either the bottom or the top, is brought into place either manually or by closing in the handling-frame, to which it may be temporarily secured. Either course—that is, the placing of the final closure manually or the closing in of the frame—may be used as may be most convenient. If the workman be making a mold with a simulated rock-face or broken face in which one of the closures, either the top or the bottom, is concave, that concaved part of the mold should be used at the bottom of the open mold into which the material is to be filled, in order that the workman may strike the upper side straight and smooth. After the stone material has been filled into the mold it is advisable and generally necessary to turn the mold to bring the ornamental face of the finished stone to the upper side, in order that the side pieces may be removed and the block of green material removed to the drying-grounds without removing it from the board upon which it rests. The stone and the board together being removed and that closure part which is used to mold the simulated rock-face, which is generally of iron and an expensive part of the mold, may be reused immediately.

The handling-frame with the two bars 16 and 17 make it easy and convenient to reverse the stone in its green state, as just described, and, in fact, the general course of construction adopted by the workman is to bring the green stone to the position shown in Fig. 2, spread the side pieces of the mold and remove them from the green stone, place the side pieces over on the face part 13 of the mold, remove the green block of stone and the bottom board on which it rests, refill the mold now resting on the frame-pieces 10, place a new piece 8 on the now top of the mold, bring the frame-bars 11 over to the position shown in Fig. 1, then roll the entire frame half over and open back the piece 10 to the position shown in Fig. 2.

The pins 21 are provided on their inner ends with stops 22, which prevent them from dropping out of the socket in which they are located, and the bottom 23 of the bore prevents them from dropping too far in.

What I claim is—

1. In a mold for artificial stone, in combination with side pieces hinged together, pins engaging in sockets in said side plates adapted to drop and project from the under side thereof, and to drop into said sockets flush with the upper side thereof, removable top and bottom closures for said mold, and a hinged handling-frame having rocker members hinged intermediate bearing members, and with the said bearing members provided with connecting-rods, whereby they may be handled and actuated, substantially as described.

2. In combination with a mold for artificial stone, a handling-frame comprising an intermediate rocker-frame and terminal bearing-frames pivotally connected to the rocker-frame, substantially as described.

3. In combination with a mold for producing artificial stone, a handling-frame comprising an intermediate rocker-frame and terminal bearing-frames pivotally connected to said rocker-frame, the pivoted ends of the terminal frames being curved to form in connection with the ends of the rocker-frame a continuous curvature, substantially as described.

4. In a mold for making artificial stone, in combination with a side and end piece pivotally connected, a stop-pin sliding transverse to said side and adapted to drop by gravity to a projecting position below the same, substantially as described.

5. In a mold for making artificial stone, in combination with a side and end piece pivotally connected, a stop-pin sliding transverse to said side and adapted to drop by gravity to a projecting position below the same, and when reversed to drop by gravity into a socket with its face retracted from a projecting position, substantially as described.

In testimony whereof I sign this specification in the presence of two witnesses.

FRANK F. COLE.

Witnesses:
A. F. COOPER,
M. D. WEEKS.